Sept. 10, 1940.  G. H. FRIEND, JR  2,213,957
APPARATUS FOR MAKING COMPOSITE WRAPPING MATERIAL
Filed July 31, 1936  4 Sheets-Sheet 1

INVENTOR.
Gordon H. Friend, Jr.
BY
ATTORNEY.

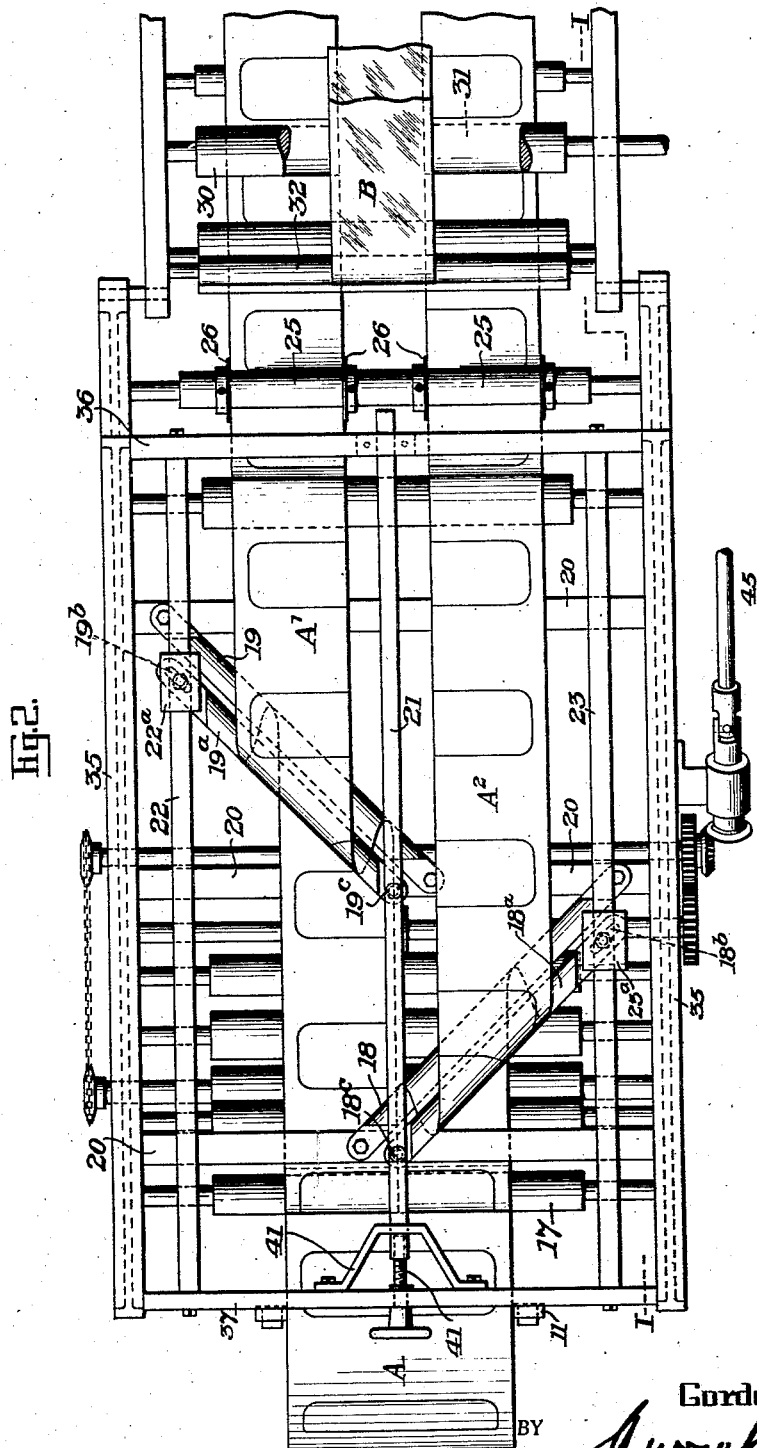

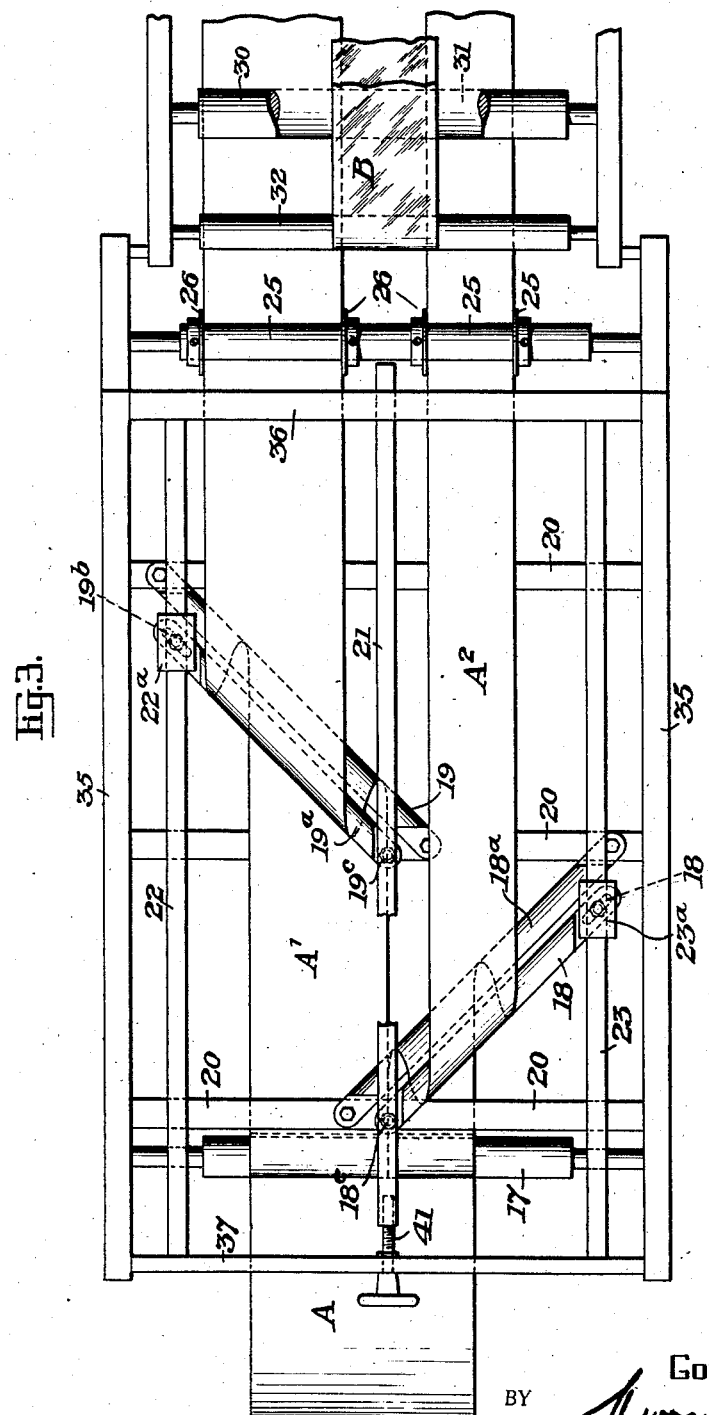

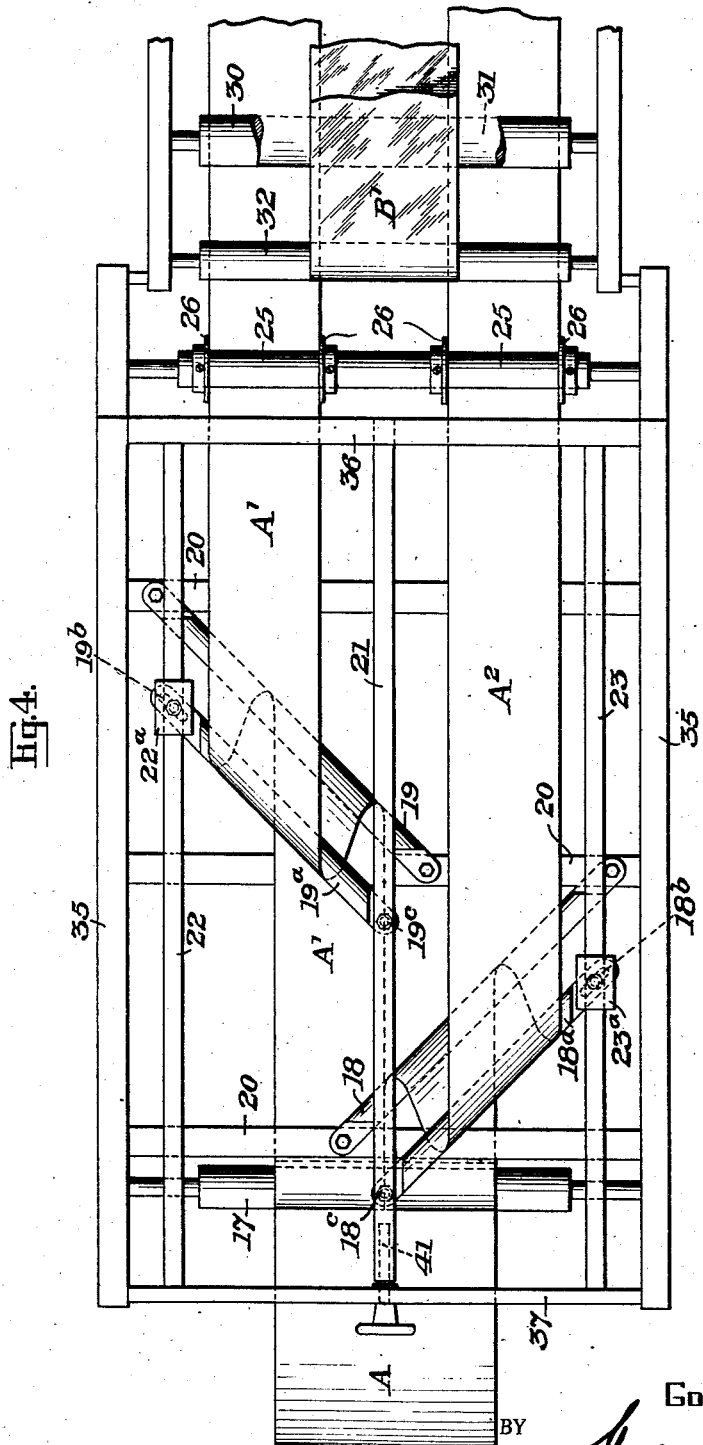

Patented Sept. 10, 1940

2,213,957

UNITED STATES PATENT OFFICE 2,213,957

APPARATUS FOR MAKING COMPOSITE WRAPPING MATERIAL

Gordon H. Friend, Jr., Bryn Mawr, Pa., assignor to Thomas M. Royal & Company, Philadelphia, Pa., a corporation of Pennsylvania Application July 31, 1936, Serial No. 93,741

2 Claims. (Cl. 164—61)

My invention relates to the preparation of socalled composite wrapping material which may be subsequently developed into wrappers, enclosures, containers, bags and/or the like.

Composite wrapping material as heretofore made comprises a plurality of sections of flexible material including usually a section of transparent material associated with sections of papers, which may or may not be opaque; the usual arrangement being a section of transparent material, such as "Cellophane" or the like, flanked by strips of paper. In many instances paper or other material of a translucent character, such as "Glassine" and/or the like, is employed.

When these composite wrappers are employed for the wrapping of bread and other edibles, and when made into containers for certain goods, it is desirable that the flanking sections of paper or other material shall be waxed or otherwise coated. Further, as a practical matter, such wrappers must bear printed matter indicating the contents inclosed by the wrapping and in order that waxed sections may be conveniently employed they must be printed before being waxed. It is often necessary that the imprints should be in exact register across the complete composite web and as it is not possible to do this when two preprinted strips or sections of paper and/or the like from separate rolls are applied independently to the section of transparent material, I have overcome this difficulty and have developed a method of utilizing a single preprinted web of paper or other suitable material, which may be wax coated after being printed; slitting such web so as to provide two sections of the same in parallel relation which will flank the transparent section and have provided means whereby the three sections may be associated into a continuous web of composite character from which unit sections may be cut for transformation into wrappers or enclosures, or developed into containers such as bags.

My invention comprises the method of operation or preparation as well as means for slitting the preprinted and/or waxed or otherwise coated web into two sections, which may be of the same width or of different widths; separating these sections laterally, and presenting the separated sections to a section or strip of transparent material, such as "Cellophane" and/or the like, for permanent association therewith, with the printed matter carried by the respective flanking sections in exact registry transversely of the web of composite material.

These and other features of my invention are more fully set forth hereinafter, reference being had to the accompanying drawings, more or less diagrammatic in character, in which:

Fig. 2 is a plan view of the structure shown in Fig. 1.

Figure 1:
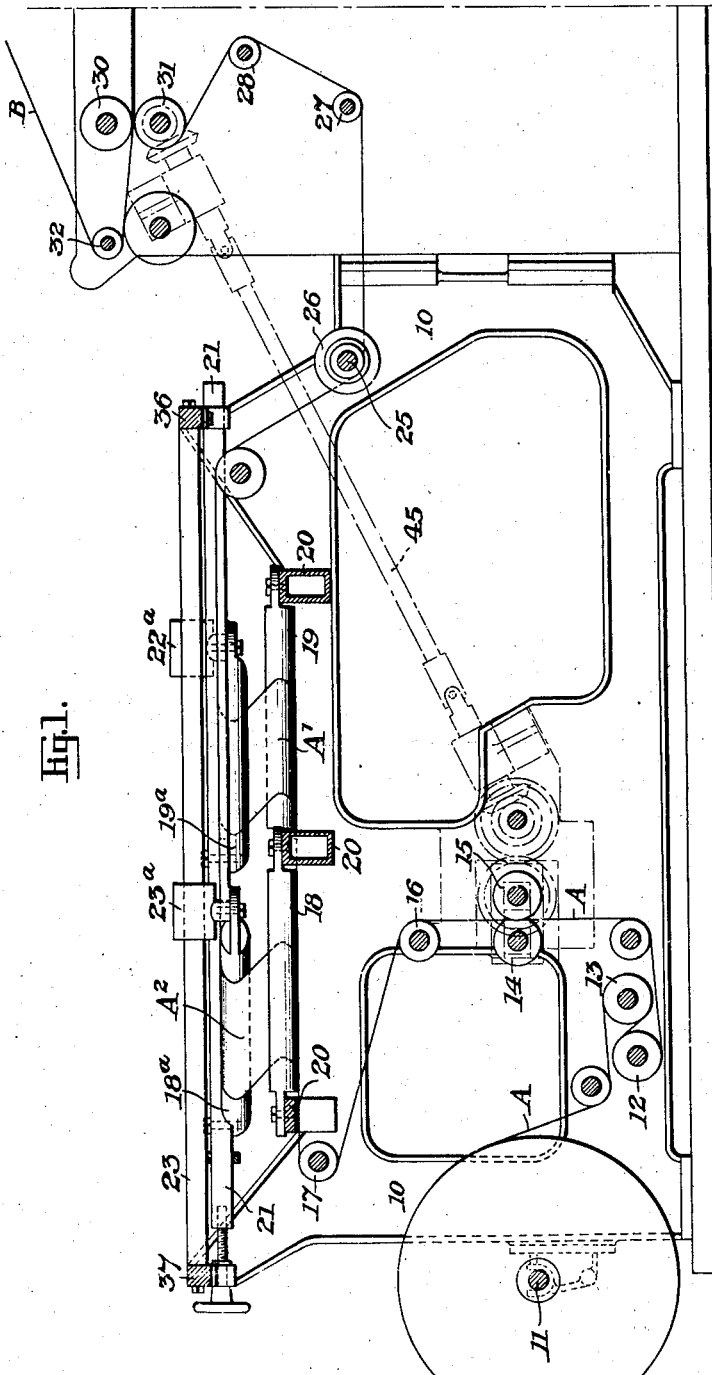
Figure 1 is a longitudinal elevation, partly in section on the line I—I, Fig. 2, of apparatus which may be employed in carrying out the method of forming my improved composite wrapping material.

Fig. 3 is a view similar to Fig. 2, but omitting some of the mechanism, to show the manner in which an adjustment may be made in connection with the paper guiding means to provide paper sections of different width, and Fig. 4 is a similar view illustrating the manner in which further adjustment may be made to separate the paper sections to a greater extent whereby a wider section of transparent material may be employed.

Wrapping material of the composite type is largely used in the formation or production of wrappers for packaging bread and other articles of food, and for the formation of bags and similar containers and in many cases it is desirable to have the paper sections provided with a waxed or other coating; preferably on both sides. In addition the paper is printed and the waxed or other coating is applied over the printed surface.

In carrying out my invention I provide a suitable frame indicated generally at 10, supporting a series of guide rolls over which the paper may pass. Mounted on a shaft 11, I provide a reel of preprinted paper A, which paper may have a coating of wax on one or both surfaces. This paper web is directed around suitably driven draw rolls 12 and 13, and past slitting means which may comprise a pair of suitably driven rotary cutting knives 14 and 15, which divide the paper web A into two parallel sections; hereinafter referred to as "A'" and "A²".

From the slitting means, the two separated sections of paper, A' and A², pass over guide rolls 16 and 17, and thence to sets or pairs of guide members 18 and 18ᵃ, and 19 and 19ᵃ, arranged diagonally with respect to the longitudinal movement of the separate sections of paper in parallel relation. The guide members 18 and 19 are supported by cross bars 20 connected to the side sections of the frame 10 in relatively fixed position, while the guide members 18ᵃ and 19ᵃ are disposed in an elevated plane with respect to the guide members 18 and 19, and are adjustable in a single plane relatively to the latter. These members 18ᵃ and 19ᵃ are carried by bars or rails 21, 22 and 23, disposed longitudinally of the frame; being fixed at their inner ends to the bar 21, while their outer ends are slidable with respect to the bars or rails 22 and 23. For the latter purpose the outer ends of said guide members 18ª and 19ª are secured to blocks 22ª and 23ª which are slidably mounted on the bars or rails 22 and 23. The connecting ends of the members 18ª and 19ª are slotted, as indicated at 18ᵇ and 19ᵇ so that they may be adjusted with respect to the carrying blocks 22ª and 23ª, into and out of parallelism with respect to the guide members 18 and 19.

In passing over the guide elements 18 and 18ª, and 19 and 19ª, each section of the printed web is shifted laterally in the manner indicated so that when these sections pass beyond these guide elements they are in definitely separated condition while still being maintained in parallel relation, as clearly indicated in Fig. 2. In order that they may be maintained in this definitely separated and parallel relation for guidance to the point of attachment of the transparent section, the sections A' and A² are preferably passed over guide rolls 25 having adjustable collars with flanges 26 in contact with the edges of said sections of the web so that the latter will be directed in a straight line and in exact parallelism.

The guide members 18 and 18ª, and 19 and 19ª, are of exactly the same dimensions and are mounted in precisely the same relation so that the separated sections A' and A² will have their printed matter in exact transverse alignment at all times; a relation that is maintained in their association with the section of transparent material such as "Cellophane" and/or the like.

From these rolls 25, the separated web sections A' and A² pass over guide rolls 27 and 28 and finally pass to the rolls 30 and 31, at which point they meet a web of transparent material which may be "Cellophane", indicated at B, and delivered from a suitable source, which web passes over a roll 32 and is then directed to pass between the rolls 30 and 31 and in engagement with the paper sections A' and A²; the pressure of such rolls 30 and 31 causing the two materials to be permanently secured together at their marginal overlapping edges.

Inasmuch as the preprinted paper sections may have been waxed or otherwise coated, it will be understood that a suitable form of adhesive that will insure proper and permanent engagement between the strip of transparent material, "Cellophane" or the like, and the two strips of paper A' and A², whether waxed or otherwise coated or not, presented to such transparent material at the point indicated, will be employed, and this may be applied to the inner edges of the paper sections, or to the edges of the web of transparent material or "Cellophane".

The frame of the machine includes top rails 35 to which the cross bars 20 are secured, and in addition to these cross bars, other cross bars 36 and 37 are attached to the front and rear ends of the frame. The bar 21 is slidably mounted in the cross bars 36 and 37, and the bars or rails 22 and 23 are fixed to the same.

The bar 21 is preferably square and is arranged for movement longitudinally of the machine; one end of this bar passing through the front cross bar 36 while the opposite end lies in a bracket 40 carried by the cross bar 37. This end of the bar 21 receives a screw element 41 whereby it may be adjusted longitudinally of the machine for the purpose of effecting simultaneous movement of the guide members 18ª and 19ª, so that the adjustment of the same with respect to the fixed guide members 18 and 19 will be identical in each instance.

The inner ends of the adjustable paper guide members 18ª and 19ª, are pivotally connected at 18ᶜ and 19ᶜ to this bar 21. The outer ends of these adjustable guide members are fixed to the blocks 22ª and 23ª which ride on the bars or rails 22 and 23, as before described, and it will be understood that longitudinal movement of the central bar 21 will effect movement of these adjustable guide members 18ª and 19ª longitudinally of the frame and without effecting their parallel relation with respect to the fixed guide members 18 and 19. Such adjustment is indicated in Fig. 4, where the paper guide members 18ª and 19ª are shown in much wider separation with respect to the guide members 18 and 19 than in Fig. 2, thereby increasing the space between the sections A and A', and the section of transparent material or "Cellophane" applied thereto and indicated at B', will be wider.

The type of wrapper formed from the arrangements illustrated in Figs. 2 and 4 will include preprinted paper sections of the same width, the strip of "Cellophane" B', shown in Fig. 4, however, being wider than the strip of "Cellophane" B shown in Fig. 2. It will be understood of course, that instead of making wrappers, this composite web may be directed to suitable bag making machinery and that in the utilization of composite webs of the type shown in Figs. 2 and 4, the bag seam will be centrally disposed.

In Fig. 3, I have shown the reel of preprinted paper so mounted that the slitting operation will be performed off center so to speak, so that one paper section, A' for instance, will be wider than the other, indicated at A². This condition is effected by shifting the reel of paper laterally along its supporting shaft 11 so as to position the same off center with respect to the slitters, which occupy a fixed position in the longitudinal axis of the machine. The composite web of this type, when employed in the production of bags, will be seamed at the edge of the bag.

My improved mechanism for associating independent strips of preprinted and waxed or otherwise coated paper with a section of transparent material, which may be "Cellophane", secured to the same between such strips is designed to be mounted in advance of means that will transform this composite sheet into bags or similar containers, or mechanism that will cut the same into bread wraps which may be directly applied to the articles to be wrapped.

Inasmuch as the preprinted web may have been waxed or otherwise coated before association with the transparent web, it will be necessary to add means which will assure proper adhesion between these two elements. This may be accomplished in various ways inasmuch as it is already known to associate transparent material such as "Cellophane" with wax coated papers.

It will be understood of course that the draw rolls 12 and 13 over which the single web of paper A passes from the reel to the slitting means, and the rolls 30 and 31 which effect movement of the composite web, are driven in exact synchronism so that no slack will occur in the passage of the paper sections A' and A² to the point where the section of transparent material, "Cellophane" or the like, is joined to such paper sections, and I have shown suitable gearing, including a counter shaft 45, for effecting this synchronous movement. The slitting means may be driven from the shaft 45.

The several rolls over which the paper passes may be driven by suitable means, including gearing and chain drives, that will insure that the travel of the single web of paper to the cutting means, and the travel of the separated sections from the slitters, past the guide members which effect lateral separation, to the rolls 30 and 31 which secure the section of transparent material to the separated sections A' and A², will be uniform and in exact synchronism.

In lieu of passing the composite web as formed by my improved mechanism to a wrapping machine, bag-making machine, or to cutting means, it may be reeled for subsequent use in a bag-making machine or wrapping machine, and it may be driven from the operating mechanism of the bag-making or wrapping machine, or other apparatus with which it may be properly associated.

I have referred herein to the use of "Cellophane" as the transparent section of my improved composite wrapping material, whether plain, moisture-proof, or that type known in the trade as "M. S. T.". I do not wish to be limited to the use of "Cellophane"—plain, moisture-proof, M. S. T. type or otherwise—as the transparent portion of my improved composite wrapping material, however, and I may employ the so-called "crystalline" or "glassine" of commerce; gelatin; Celluloid; Pyralin, or any other transparent material sufficiently flexible to be employed in the formation of packages, bags or other containers or as the wrapping for various forms of packages, boxes, containers, and/or the like, when associated with waxed or otherwise coated paper sections making up the composite wrapping material which I have developed.

I have referred to the use of preprinted wax-coated paper sections in the manufacture of my improved composite wrapping material, but it will be understood that other forms of coatings may be applied to and over the preprinted surface of such paper sections without departing from my invention, and my claims are intended to cover wax-coated paper as well as paper coated with other suitable material.

While the elements shown and described are well adapted to serve the purposes for which they are intended, it is to be understood that the invention is not limited to the precise constructions set forth, but includes within its scope such changes and modifications as may be made within the terms of the appended claims.

I claim:

1. The combination, in means for producing composite webs from a reel of preprinted and waxed paper, of means for unrolling the paper, means for longitudinally slitting the paper as it is delivered from said reel, two sets of angularly disposed guide elements over which the separated sections of the paper are passed; said guide elements effecting lateral displacement of the respective sections and one element of each set being adjustable, rails supporting the outer ends of said adjustable guide members and a bar longitudinally movable with respect to the paper sections to which the inner ends of said adjustable guide members are fixed.

2. The combination, in means for producing composite webs from a reel of preprinted and waxed paper, of means for unrolling the paper, means for longitudinally slitting the paper as it is delivered from said reel, two sets of angularly disposed guide elements over which the separated sections of the paper are passed; said guide elements effecting lateral displacement of the respective sections and one element of each set being adjustable, rails supporting the outer ends of said adjustable guide members and upon which the latter are freely movable, a movably mounted bar extending longitudinally of the paper sections to which the inner ends of said adjustable guide members are fixed, and means for imparting movement to said bar to effect simultaneous adjustment of said guide members.

GORDON H. FRIEND, Jr.